United States Patent
Li et al.

(10) Patent No.: US 10,879,808 B2
(45) Date of Patent: *Dec. 29, 2020

(54) SWITCHED-TANK DC TRANSFORMER AND VOLTAGE RATIO SWITCHING METHOD THEREOF

(71) Applicant: Delta Electronics (Shanghai) Co., Ltd., Shanghai (CN)

(72) Inventors: Ming Li, Shanghai (CN); Yiqing Ye, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,382

(22) Filed: Nov. 6, 2019

(65) Prior Publication Data

US 2020/0153347 A1    May 14, 2020

(30) Foreign Application Priority Data

Nov. 12, 2018  (CN) .......................... 2018 1 1338938

(51) Int. Cl.
*H02M 3/335*   (2006.01)
*H02M 3/337*   (2006.01)
(Continued)

(52) U.S. Cl.
CPC .......... *H02M 3/33569* (2013.01); *H02M 3/07* (2013.01); *H02M 3/073* (2013.01);
(Continued)

(58) Field of Classification Search
CPC ......... H02M 3/33569; H02M 3/33546; H02M 3/3376; H02M 3/07; H02M 3/073; H02M 2001/0058
See application file for complete search history.

(56) References Cited

U.S. PATENT DOCUMENTS 9,831,776 B1 *  11/2017  Jiang ..................... H02M 3/158
9,866,130 B1 *   1/2018  Choi ................... H02M 3/3376
(Continued)

FOREIGN PATENT DOCUMENTS

CN      101534104 A     9/2009
CN      103701331 A     4/2014
(Continued)

OTHER PUBLICATIONS

Jiang, Shuai et al., Switched Tank Converters, IEEE Xplore, 2018, pp. 81-90.

*Primary Examiner* — Jeffrey A Gblende
*Assistant Examiner* — Lakaisha Jackson
(74) *Attorney, Agent, or Firm* — Kirton McConkie; Evan R. Witt

(57) ABSTRACT

A switched-tank DC transformer and a voltage ratio switching method thereof are provided. The switched-tank DC transformer includes an input terminal, an output terminal, 2n inverting switches, 2n rectifying switches, 2n−2 clamping switches, n resonance tanks and n−1 support capacitors. The inverting switches are serially connected in sequence. There is an inverting node between every two neighboring inverting switches. A terminal of the rectifying switch is connected with a rectifying node. A terminal of the two clamping switch is electrically connected with a clamping node. The resonance tank is electrically connected between the inverting node and the rectifying node. The support capacitor is electrically connected between the inverting node and the clamping node. Every support capacitor and every resonance tank is switchable to be in a normal state or a voltage ratio switching state, thus a voltage ratio of the switched-tank DC transformer is allowed to vary correspondingly.

20 Claims, 14 Drawing Sheets

(51) Int. Cl.
  *H02M 1/00* (2006.01)
  *H02M 3/07* (2006.01)
(52) U.S. Cl.
  CPC ...... *H02M 3/3376* (2013.01); *H02M 3/33546* (2013.01); *H02M 2001/0058* (2013.01)

(56) References Cited

U.S. PATENT DOCUMENTS

| | | | |
|---|---|---|---|
| 9,917,517 B1* | 3/2018 | Jiang | H02M 3/338 |
| 9,966,842 B1 | 5/2018 | Jiang et al. | |
| 2017/0025954 A1* | 1/2017 | Barthold | H02M 3/155 |
| 2017/0085183 A1* | 3/2017 | Notsch | H02M 1/12 |
| 2017/0093294 A1* | 3/2017 | Dai | H02M 3/33507 |

FOREIGN PATENT DOCUMENTS

| | | |
|---|---|---|
| CN | 204538976 U | 8/2015 |
| CN | 204696926 U | 10/2015 |
| CN | 103326580 B | 8/2016 |
| CN | 106130356 A | 11/2016 |
| CN | 106655788 A | 5/2017 |
| CN | 107395010 A | 11/2017 |
| CN | 108696140 A | 10/2018 |
| EP | 2908418 A1 | 8/2015 |
| WO | 2016149319 A1 | 9/2016 |

\* cited by examiner

SWITCHED-TANK DC TRANSFORMER AND VOLTAGE RATIO SWITCHING METHOD THEREOF

CROSS-REFERENCE TO RELATED APPLICATION

This application claims priority to China Patent Application No. 201811338938.9, filed on Nov. 12, 2018, the entire content of which is incorporated herein by reference for all purposes.

FIELD OF THE DISCLOSURE

The present disclosure relates to a switched-tank DC transformer, and more particularly to a switched-tank DC transformer and a voltage ratio switching method thereof.

BACKGROUND OF THE DISCLOSURE

For ensuring the performance of the efficiency and quality of supplying power, the voltage regulator module (VRM) with intermediate bus architecture (IBA) is usually utilized for transforming the power. The intermediate bus architecture includes an intermediate bus transformer. Generally, the conventional intermediate bus transformer is a low-frequency switching DC transformer or a full-bridge LLC circuit. The low-frequency switching DC transformer regulates the output voltage by changing the duty ratio, thus the adjustable output voltage is achieved. The full-bridge LLC circuit can achieve zero-voltage switching (ZVS) over the full range. Therefore, by controlling the switching frequency to equal the resonance frequency of the tank of the full-bridge LLC circuit, the voltage ratio is ensured to be the same at different loads, and a high efficiency of power transformation is achieved.

However, due to the high voltage ratio of the low-frequency switching DC transformer, the efficiency of power transformation thereof is low. In addition, due to the fixed voltage ratio of the full-bridge LLC circuit, the output voltage thereof is not adjustable. Consequently, neither the low-frequency switching DC transformer nor the full-bridge LLC circuit is able to achieve the high efficiency as well as the adjustable output voltage.

Therefore, there is a need of providing a switched-tank DC transformer and a voltage ratio switching method thereof in order to overcome the above drawbacks.

SUMMARY OF THE DISCLOSURE

An object of the present disclosure provides a switched-tank DC transformer and a voltage ratio switching method thereof. In the switched-tank DC transformer, every support capacitor and every resonance tank is switchable to be in a normal state or a voltage ratio switching state. Accordingly, the voltage ratio of the switched-tank DC transformer is changed at will. When the input voltage varies in a wide range, the range of the output voltage can be limited by adjusting the voltage ratio of the switched-tank DC transformer. Therefore, both the high efficiency of power transformation and the adjustable output voltage are achieved. Moreover, with regard to the voltage regulator module including the switched-tank DC transformer, the efficiency and quality of supplying power thereof are enhanced.

In accordance with an aspect of the present disclosure, there is provided a switched-tank DC transformer. The switched-tank DC transformer includes an input terminal, an output terminal, 2n inverting switches, 2n rectifying switches, 2n−2 clamping switches, n resonance tanks and n−1 support capacitors. The 2n inverting switches are serially connected in sequence and form n inverting half-bridge circuits, where n is an integer larger than or equal to 2. The first inverting switch is electrically connected with the output terminal, the (2n)th inverting switch is electrically connected with the input terminal, there is an inverting node between every two neighboring inverting switches, the (2i−1)th inverting node is between the (2i)th inverting switch and the (2i−1)th inverting switch, and i is an integer larger than or equal to 2 and smaller than or equal to n. The 2n rectifying switches form n rectifying half-bridge circuits sequentially. Each of the n rectifying half-bridge circuits includes two rectifying switches serially connected with each other, one terminal of both the two rectifying switches are electrically connected with a rectifying node, the other terminal of the two rectifying switches are electrically connected with a ground terminal and the output terminal respectively, and the (i)th rectifying node is between the (2i)th rectifying switch and the (2i−1)th rectifying switch. The 2n−2 clamping switches form n−1 clamping half-bridge circuits sequentially. Each of the n−1 clamping half-bridge circuits includes two clamping switches serially connected with each other, one terminal of both the two clamping switches are electrically connected with a clamping node, the other terminal of the two clamping switches are electrically connected with the ground terminal and the output terminal respectively, and the (i−1)th clamping node is between the (2i−2)th clamping switch and the (2i−3)th clamping switch. The resonance tank is electrically connected between the corresponding inverting node and the corresponding rectifying node, and the (i)th resonance tank is electrically connected between the (2i−1)th inverting node and the (i)th rectifying node. The support capacitor is electrically connected between the corresponding inverting node and the corresponding clamping node, and the (i−1)th support capacitor is electrically connected between the (2i−2)th inverting node and the (i−1)th clamping node. Each of the n−1 support capacitors is switchable to be in a normal state or a voltage ratio switching state, and each of the n resonance tanks is switchable to be in the normal state or the voltage ratio switching state, thus a voltage ratio of the switched-tank DC transformer is allowed to vary between 2 and 2n. When the (i−1)th support capacitor is in the normal state, the (i−1)th clamping node is electrically connected with the ground terminal and the output terminal by turns. When the (i−1)th support capacitor is in the voltage ratio switching state, the (i−1)th clamping node is kept constantly in an open-circuit condition, the (2i)th inverting switch or the (2i−2)th inverting switch is kept constantly in an ON state, the (2i−1)th inverting switch or the (2i−3)th inverting switch is kept constantly in the ON state. When the (i)th resonance tank is in the normal state, the (i)th rectifying node is electrically connected with the output terminal and the ground terminal by turns. When the (i)th resonance tank is in the voltage ratio switching state, the (i)th rectifying node is kept constantly in the open-circuit condition, the (2i+1)th inverting switch or the (2i−1)th inverting switch is kept constantly in the ON state, the (2i)th inverting switch or the (2i−2)th inverting switch is kept constantly in the ON state.

In accordance with another aspect of the present disclosure, there is provided a voltage ratio switching method of a switched-tank DC transformer. The switched-tank DC transformer includes an input terminal, an output terminal, 2n inverting switches, 2n rectifying switches, 2n−2 clamping switches, n resonance tanks and n−1 support capacitors, where n is an integer larger than or equal to 2. The 2n inverting switches are serially connected in sequence and form n inverting half-bridge circuits, the first inverting switch is electrically connected with the output terminal, the (2n)th inverting switch is electrically connected with the input terminal, there is an inverting node between every two neighboring inverting switches, the (2i−1)th inverting node is between the (2i)th inverting switch and the (2i−1)th inverting switch, and i is an integer larger than or equal to 2 and smaller than or equal to n. The 2n rectifying switches form n rectifying half-bridge circuits sequentially, each of the n rectifying half-bridge circuits includes two rectifying switches serially connected with each other, one terminal of both the two rectifying switches are electrically connected with a rectifying node, the other terminal of the two rectifying switches are electrically connected with a ground terminal and the output terminal respectively, and the (i)th rectifying node is between the (2i)th rectifying switch and the (2i−1)th rectifying switch. The 2n−2 clamping switches form n−1 clamping half-bridge circuits sequentially, each of the n−1 clamping half-bridge circuits includes two clamping switches serially connected with each other, one terminal of both the two clamping switches are electrically connected with a clamping node, the other terminal of the two clamping switches are electrically connected with the ground terminal and the output terminal respectively, and the (i−1)th clamping node is between the (2i−2)th clamping switch and the (2i−3)th clamping switch. The resonance tank is electrically connected between the corresponding inverting node and the corresponding rectifying node, and the (i)th resonance tank is electrically connected between the (2i−1)th inverting node and the (i)th rectifying node. The support capacitor is electrically connected between the corresponding inverting node and the corresponding clamping node, and the (i−1)th support capacitor is electrically connected between the (2i−2)th inverting node and the (i−1)th clamping node. The voltage ratio switching method controls every support capacitor to be switchably in a normal state or a voltage ratio switching state. The voltage ratio switching method controls every resonance tank to be switchably in the normal state or the voltage ratio switching state. The voltage ratio switching method allows a voltage ratio of the switched-tank DC transformer to vary between 2 and 2n. The voltage ratio switching method includes: (a) controlling the (i−1)th support capacitor to be in the normal state, namely controlling the (i−1)th clamping node to electrically connect the ground terminal and the output terminal by turns; (b) controlling the (i−1)th support capacitor to be in the voltage ratio switching state, namely controlling the (i−1)th clamping node to be constantly in an open-circuit condition, controlling the (2i)th inverting switch or the (2i−2)th inverting switch to be constantly in an ON state, and controlling the (2i−1)th inverting switch or the (2i−3)th inverting switch to be constantly in the ON state; (c) controlling the (i)th resonance tank to be in the normal state, namely controlling the (i)th rectifying node to electrically connect the output terminal and the ground terminal by turns; and (d) controlling the (i)th resonance tank to be in the voltage ratio switching state, namely controlling the (i)th rectifying node to be constantly in the open-circuit condition, controlling the (2i+1)th inverting switch or the (2i−1)th inverting switch to be constantly in the ON state, and controlling the (2i)th inverting switch or the (2i−2)th inverting switch to be constantly in the ON state.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
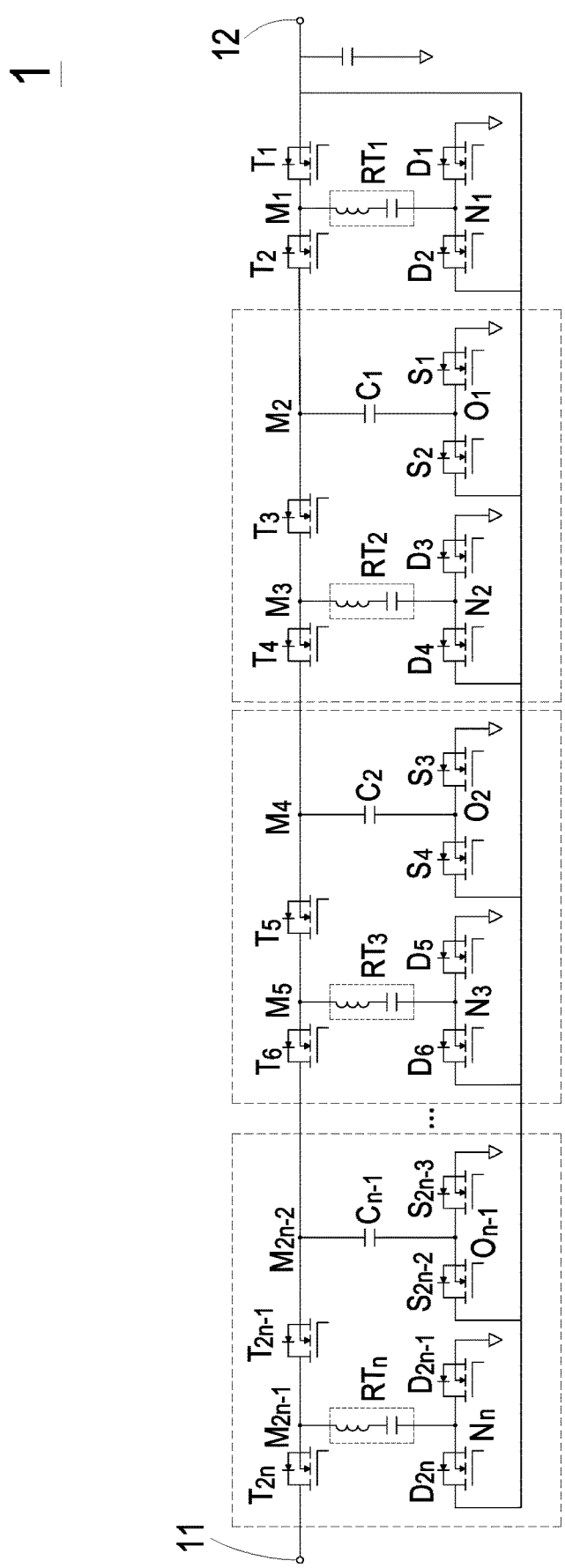
FIG. 1 is a schematic circuit diagram illustrating a switched-tank DC transformer according to an embodiment of the present disclosure.

FIG. 1 is a schematic circuit diagram illustrating a switched-tank DC transformer according to an embodiment of the present disclosure. As shown in FIG. 1, the switched-tank DC transformer 1 includes an input terminal 11, an output terminal 12, 2n inverting switches ($T_1$, $T_2$ to $T_{2n}$), 2n rectifying switches ($D_1$, $D_2$ to $D_{2n}$), 2n−2 clamping switches ($S_1$, $S_2$ to $S_{2n-2}$), n resonance tanks ($RT_1$, $RT_2$ to $RT_n$) and n−1 support capacitors ($C_1$, $C_2$ to $C_{n-1}$), where n is an integer larger than or equal to 2. There are an input voltage and an output voltage on the input terminal 11 and the output terminal 12 respectively. The ratio of the input voltage to the output voltage is the voltage ratio of the switched-tank DC transformer 1.

The 2n inverting switches $T_1$, $T_2$ to $T_{2n}$ are serially connected in sequence and form n inverting half-bridge circuits. The first inverting switch $T_1$ is electrically connected with the output terminal 12, and the (2n)th inverting switch $T_{2n}$ is electrically connected with the input terminal 11. There is an inverting node ($M_1$, $M_2$ to $M_{2n-1}$) between every two neighboring inverting switches ($T_1$, $T_2$ to $T_{2n}$). The first inverting node $M_1$ is between the first inverting switch $T_1$ and the second inverting switch $T_2$. The second inverting node $M_2$ is between the second inverting switch $T_2$ and the third inverting switch $T_3$. The (2n−1)th inverting node $M_{2n-1}$ is between the (2n−1)th inverting switch $T_{2n-1}$ and the (2n)th inverting switch $T_{2n}$. On this basis, the (2i−1)th inverting node $M_{2i-1}$ is between the (2i−1)th inverting switch $T_{2i-1}$ and the (2i)th inverting switch $T_{2i}$, where i is an integer larger than or equal to 2 and smaller than or equal to n.

The 2n rectifying switches $D_1$, $D_2$ to $D_{2n}$ form n rectifying half-bridge circuits sequentially. Each rectifying half-bridge circuit includes two rectifying switches ($D_1$, $D_2$ to $D_{2n}$) serially connected with each other. One terminal of both the two rectifying switches ($D_1$, $D_2$ to $D_{2n}$) are electrically connected with a rectifying node ($N_1$, $N_2$ to $N_n$), and the other terminal of the two rectifying switches ($D_1$, $D_2$ to $D_{2n}$) are electrically connected with a ground terminal and the output terminal 12 respectively. The first rectifying node $N_1$ is between the first rectifying switch $D_1$ and the second rectifying switch $D_2$. The second rectifying node $N_2$ is between the third rectifying switch $D_3$ and the fourth rectifying switch $D_4$. The (n)th rectifying node $N_n$ is between the (2n−1)th rectifying switch $D_{2n-1}$ and the (2n)th rectifying switch $D_{2n}$. On this basis, the (i)th rectifying node $N_i$ is between the (2i−1)th rectifying switch $D_{2i-1}$ and the (2i)th rectifying switch $D_{2i}$.

The 2n−2 clamping switches $S_1$, $S_2$ to $S_{2n-2}$ form n−1 clamping half-bridge circuit(s) sequentially. Each clamping half-bridge circuit includes two clamping switches ($S_1$, $S_2$ to $S_{2n-2}$) serially connected with each other. One terminal of both the two clamping switches ($S_1$, $S_2$ to $S_{2n-2}$) are electrically connected with a clamping node ($O_1$, $O_2$ to $O_n$), and the other terminal of the two clamping switches ($S_1$, $S_2$ to $S_{2n-2}$) are electrically connected with the ground terminal and the output terminal 12 respectively. The first clamping node $O_1$ is between the first clamping switch $S_1$ and the second clamping switch $S_2$. The second clamping node $O_2$ is between the third clamping switch $S_3$ and the fourth clamping switch $S_4$. The (n−1)th clamping node $O_{n-1}$ is between the (2n−3)th clamping switch $S_{2n-3}$ and the (2n−2)th clamping switch $S_{2n-2}$. On this basis, the (i−1)th clamping node $O_{i-1}$ is between the (2i−3)th clamping switch $S_{2i-3}$ and the (2i−2)th clamping switch $S_{2i-2}$.

The resonance tank ($RT_1$, $RT_2$ to $RT_n$) is electrically connected between the corresponding inverting node ($M_1$, $M_2$ to $M_{2n-1}$) and the corresponding rectifying node ($N_1$, $N_2$ to $N_n$). The first resonance tank $RT_1$ is electrically connected between the first inverting node $M_1$ and the first rectifying node $N_1$. The second resonance tank $RT_2$ is electrically connected between the third inverting node $M_3$ and the second rectifying node $N_2$. The (n)th resonance tank $RT_n$ is electrically connected between the (2n−1)th inverting node $M_{2n-1}$ and the (n)th rectifying node $N_n$. On this basis, the (i)th resonance tank $RT_1$ is electrically connected between the (2i−1)th inverting node $M_{2i-1}$ and the (i)th rectifying node $N_i$. In an embodiment, each resonance tank ($RT_1$, $RT_2$ to $RT_n$) includes an inductor and a capacitor serially connected with each other. In another embodiment, each resonance tank ($RT_1$, $RT_2$ to $RT_n$) includes an inductor or a capacitor.

The support capacitor ($C_1$, $C_2$ to $C_{n-1}$) is electrically connected between the corresponding inverting node ($M_1$, $M_2$ to $M_{2n-1}$) and the corresponding clamping node ($O_1$, $O_2$ to $O_n$). The first support capacitor $C_1$ is electrically connected between the second inverting node $M_2$ and the first clamping node $O_1$. The second support capacitor $C_2$ is electrically connected between the fourth inverting node $M_4$ and the second clamping node $O_2$. The (n−1)th support capacitor $C_{n-1}$ is electrically connected between the (2n−2)th inverting node $M_{2n-2}$ and the (n−1)th clamping node $O_{n-1}$. On this basis, the (i−1)th support capacitor $C_{i-1}$ is electrically connected between the (2i−2)th inverting node $M_{2i-2}$ and the (i−1)th clamping node $O_{i-1}$.

In the switched-tank DC transformer 1, every support capacitor ($C_1$, $C_2$ to $C_{n-1}$) is switchable to be in a normal state, a first voltage ratio switching state or a second voltage ratio switching state, and every resonance tank ($RT_1$, $RT_2$ to $RT_n$) is switchable to be in the normal state or the second voltage ratio switching state. Accordingly, the voltage ratio of the switched-tank DC transformer 1 is allowed to vary between 1 and 2n. When the input voltage varies in a wide range, the range of the output voltage is limited by adjusting the voltage ratio of the switched-tank DC transformer 1. Therefore, both the high efficiency of power transformation and the adjustable output voltage are achieved. According to the states of the support capacitors ($C_1$, $C_2$ to $C_{n-1}$) and the resonance tanks ($RT_1$, $RT_2$ to $RT_n$), the operations of the nodes and switches of the switched-tank DC transformer 1 are described in detail as follows.

When the (i−1)th support capacitor $C_{i-1}$ is in the normal state, the (i−1)th clamping node $O_{i-1}$ is electrically connected with the ground terminal and the output terminal 12 by turns. When the (i)th resonance tank $RT_i$ is in the normal state, the (i)th rectifying node $N_i$ is electrically connected with the output terminal 12 and the ground terminal by turns. In an embodiment, when the first resonance $RT_i$ is in the normal state, the first rectifying node $N_1$ is electrically connected with the output terminal 12 and the ground terminal by turns. In addition, when the (i−1)th support capacitor $C_{i-1}$ and the (i)th resonance tank $RT_i$ are both in the normal state, the (2i−2)th clamping switch $S_{2i-2}$, the (2i−1)th inverting switch $T_{2i-1}$ and the (2i−1)th rectifying switch $D_{2i-1}$ are simultaneously in an ON state or an OFF state. Correspondingly, the (2i−3)th clamping switch $S_{2i-3}$, the (2i)th inverting switch $T_{2i}$ and the (2i)th rectifying switch $D_{2i}$ are simultaneously in the OFF state or the ON state. In an embodiment, when the (i−1)th support capacitor $C_{i-1}$ and the (i)th resonance tank $RT_i$ are both in the normal state, the (2i−2)th clamping switch $S_{2i-2}$ and the (2i−3)th clamping switch $S_{2i-3}$ have opposite switch conditions and switch on by turns. The (2i−1)th inverting switch $T_{2i-1}$ and the (2i)th inverting switch $T_{2i}$ have opposite switch conditions and switch on by turns. The (2i−1)th rectifying switch $D_{2i-1}$ and the (2i)th rectifying switch $D_{2i}$ have opposite switch conditions and switch on by turns.

When the (i−1)th support capacitor $C_{i-1}$ is in the first voltage ratio switching state, the (i−1)th clamping node $O_{i-1}$ is kept constantly in electrical connection with the ground terminal. In an embodiment, when the (i−1)th support capacitor $C_{i-1}$ is in the first voltage ratio switching state, the (2i−2)th clamping switch $S_{2i-2}$ is kept constantly in the OFF state, and the (2i−3)th clamping switch $S_{2i-3}$ is kept constantly in the ON state. Consequently, the (i−1)th clamping node $O_{i-1}$ is kept constantly in electrical connection with the ground terminal.

When the (i−1)th support capacitor $C_{i-1}$ is in the second voltage ratio switching state, the (i−1)th clamping node $O_{i-1}$ is kept constantly in an open-circuit condition, the (2i)th inverting switch $T_{2i}$ and the (2i−2)th inverting switch $T_{2i-2}$ are kept constantly in the ON state, and the (2i−1)th inverting switch $T_{2i-1}$ and the (2i−3)th inverting switch $T_{2i-3}$ are kept constantly in the ON state. In an embodiment, when the (i−1)th support capacitor $C_{i-1}$ is in the second voltage ratio switching state, the (2i−2)th clamping switch $S_{2i-2}$ and the (2i−3)th clamping switch $S_{2i-3}$ are kept constantly in the OFF state. Consequently, the (i−1)th clamping node $O_{i-1}$ is kept constantly in the open-circuit condition.

When the (i)th resonance tank $RT_i$ is in the second voltage ratio switching state, the (i)th rectifying node $N_i$ is kept constantly in the open-circuit condition, the (2i+1)th inverting switch $T_{2i+1}$ or the (2i−1)th inverting switch $T_{2i-1}$ is kept constantly in the ON state, and the (2i)th inverting switch $T_{2i}$ or the (2i−2)th inverting switch $T_{2i-2}$ are kept constantly in the ON state. In an embodiment, when the (i)th resonance tank $RT_i$ is in the second voltage ratio switching state, the (2i)th rectifying switch $D_{2i}$ and the (2i−1)th rectifying switch $D_{2i-1}$ are kept constantly in the OFF state. Consequently, the (i)th rectifying node $N_i$ is kept constantly in the open-circuit condition. In addition, when the first resonance tank $RT_1$ is in the second voltage ratio switching state, the first rectifying node $N_1$ is kept constantly in the open-circuit condition (for example, keeping the first rectifying switch $D_1$ and the second rectifying switch $D_2$ constantly in the OFF state). The third inverting switch $T_3$ or the first inverting switch $T_1$ is kept constantly in the ON state. The second inverting switch $T_2$ is kept constantly in the ON state. When the (n)th resonance tank $RT_n$ is in the second voltage ratio switching state, the (n)th rectifying node $N_n$ is kept constantly in the open-circuit condition (for example, keeping the (2n−1)th rectifying switch $D_{2n-1}$ and the (2n)th rectifying switch $D_{2n}$ constantly in the OFF state). The (2n−1)th inverting switch $T_{2n-1}$ is kept constantly in the ON state. The (2n)th inverting switch $T_{2n}$ or the (2n−2)th inverting switch $T_{2n-2}$ is kept constantly in the ON state.

Moreover, when the states of the support capacitor ($C_1$, $C_2$ to $C_{n-1}$) and/or the resonance tank ($RT_1$, $RT_2$ to $RT_n$) are switched, the voltage ratio of the switched-tank DC transformer 1 varies correspondingly. Some possible situations are listed as follows.

When any support capacitor ($C_1$, $C_2$ to $C_{n-1}$) is switched from the normal state to the first voltage ratio switching state, the voltage ratio of the switched-tank DC transformer 1 is subtracted by 1. On the contrary, when any support capacitor ($C_1$, $C_2$ to $C_{n-1}$) is switched from the first voltage ratio switching state to the normal state, the voltage ratio of the switched-tank DC transformer 1 is increased by 1. Since the n−1 support capacitors $C_1$, $C_2$ to $C_{n-1}$ are all switchable to be in the normal state or the first voltage ratio switching state, the voltage ratio of the switched-tank DC transformer 1 is allowed to vary between (n+1) and 2n.

When any support capacitor ($C_1$, $C_2$ to $C_{n-1}$) or any resonance tank ($RT_1$, $RT_2$ to $RT_n$) is switched from the normal state to the second voltage ratio switching state, the voltage ratio of the switched-tank DC transformer 1 is subtracted by 2. On the contrary, when any support capacitor ($C_1$, $C_2$ to $C_{n-1}$) or any resonance tank ($RT_1$, $RT_2$ to $RT_n$) is switched from the second voltage ratio switching state to the normal state, the voltage ratio of the switched-tank DC transformer 1 is increased by 2. Since the n−1 support capacitors $C_1$, $C_2$ to $C_{n-1}$ and the n resonance tanks $RT_1$, $RT_2$ to $RT_n$ are all switchable to be in the normal state or the second voltage ratio switching state, the voltage ratio of the switched-tank DC transformer 1 is allowed to vary between 2 and 2n.

When A support capacitor(s) ($C_1$, $C_2$ to $C_{n-1}$) is/are switched from the normal state to the first voltage ratio switching state, and B resonance tank(s) ($RT_1$, $RT_2$ to $RT_n$) is/are switched from the normal state to the second voltage ratio switching state, the voltage ratio of the switched-tank DC transformer 1 is subtracted by A+2B. On the contrary, when A support capacitor(s) ($C_1$, $C_2$ to $C_{n-1}$) is/are switched from the first voltage ratio switching state to the normal state, and B resonance tank(s) ($RT_1$, $RT_2$ to $RT_n$) is/are switched from the second voltage ratio switching state to the normal state, the voltage ratio of the switched-tank DC transformer 1 is increased by A+2B. A is a natural number smaller than or equal to n−1, and B is a natural number smaller than or equal to n. Since the n−1 support capacitors $C_1$, $C_2$ to $C_{n-1}$ are switchable to be in the normal state or the first voltage ratio switching state, and the n resonance tanks $RT_1$, $RT_2$ to $RT_n$ are switchable to be in the normal state or the second voltage ratio switching state, the voltage ratio of the switched-tank DC transformer 1 is allowed to vary between 1 and 2n.

When A support capacitor(s) ($C_1$, $C_2$ to $C_{n-1}$) and B resonance tank(s) ($RT_1$, $RT_2$ to $RT_n$) are switched from the normal state to the second voltage ratio switching state, the voltage ratio of the switched-tank DC transformer 1 is subtracted by 2A+2B. On the contrary, when A support capacitor(s) ($C_1$, $C_2$ to $C_{n-1}$) and B resonance tank(s) ($RT_1$, $RT_2$ to $RT_n$) are switched from the second voltage ratio switching state to the normal state, the voltage ratio of the switched-tank DC transformer 1 is increased by 2A+2B. Since the n−1 support capacitors $C_1$, $C_2$ to $C_{n-1}$ and the n resonance tanks $RT_1$, $RT_2$ to $RT_n$ are switchable to be in the normal state or the second voltage ratio switching state, the voltage ratio of the switched-tank DC transformer 1 is allowed to vary between 2 and 2n.

Figure 2A:
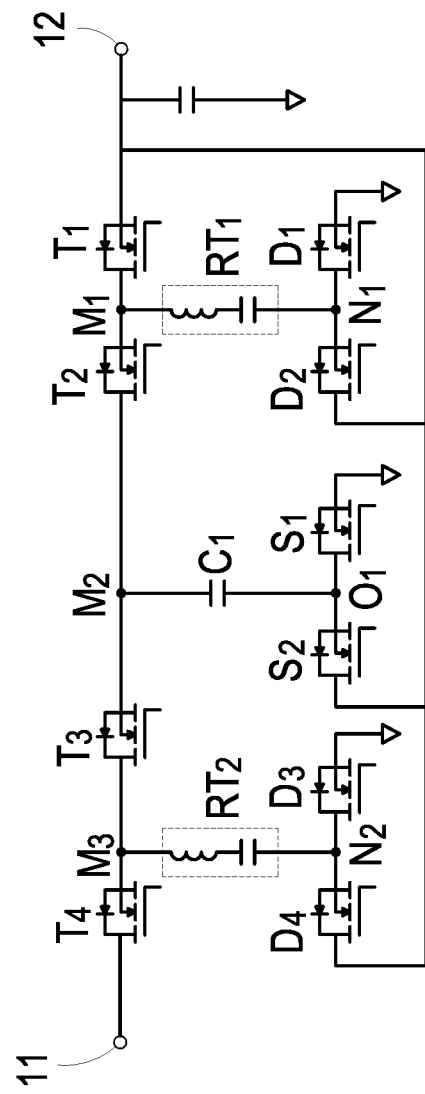
FIG. 2A is a schematic circuit diagram illustrating the switched-tank DC transformer of FIG. 1 with n equal to 2.
Figure 2B:
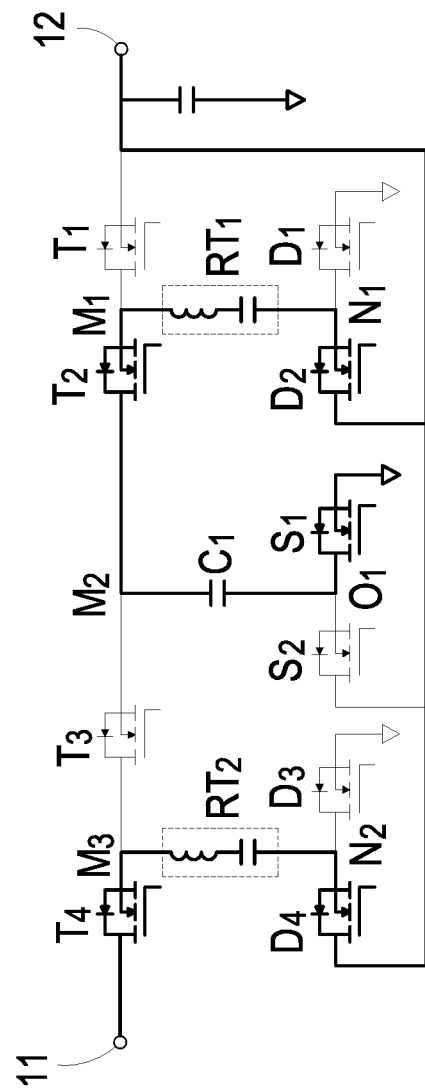
FIGS. 2B and 2C are schematic diagrams showing the different switch conditions of the switched-tank DC transformer of FIG. 2A.
Figure 2C:
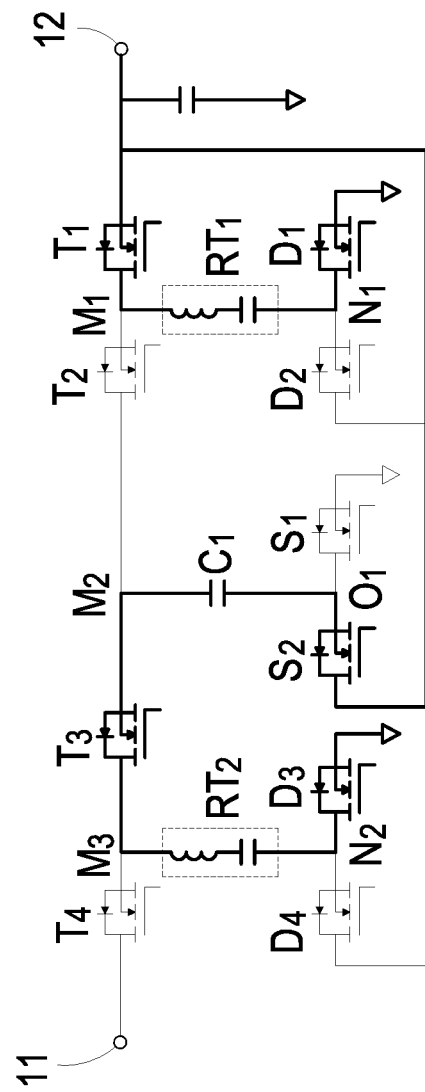

In order to be understood more easily, the switched-tank DC transformer 1 with n equal to 2 is shown as an example, but the switched-tank DC transformer of the present disclosure is not limited thereto. FIG. 2A is a schematic circuit diagram illustrating the switched-tank DC transformer of FIG. 1 with n equal to 2. FIGS. 2B and 2C are schematic diagrams showing the different switch conditions of the switched-tank DC transformer of FIG. 2A. As shown in FIG. 2A, in this embodiment, n equals 2, and the switched-tank DC transformer 1 includes an input terminal 11, an output terminal 12, four inverting switches $T_1$, $T_2$, $T_3$, $T_4$, four rectifying switches $D_1$, $D_2$, $D_3$, $D_4$, two clamping switches $S_1$, $S_2$, two resonance tanks $RT_1$, $RT_2$ and one support capacitor $C_1$. As shown in the schematic diagrams of different switch conditions (see FIGS. 2B and 2C), the part of the circuit that the current not passing through is depicted by relatively thin lines. Therefore, the current path under different switch conditions can be recognized and distinguished. As shown in FIGS. 2B and 2C, when the support capacitor $C_1$ and the resonance tanks $RT_1$, $RT_2$ are all in the normal state, the first clamping switch $S_1$, the second inverting switch $T_2$, the fourth inverting switch $T_4$, the second rectifying switch $D_2$ and the fourth rectifying switch $D_4$ are simultaneously in the ON state or the OFF state. Correspondingly, the second clamping switch $S_2$, the first inverting switch $T_1$, the third inverting switch $T_3$, the first rectifying switch $D_1$ and the third rectifying switch $D_3$ are simultaneously in the OFF state or the ON state. In particular, the first clamping switch $S_1$ and the second clamping switch $S_2$ have opposite switch conditions and switch on by turns. The first inverting switch $T_1$ and the second inverting switch $T_2$ have opposite switch conditions and switch on by turns. The third inverting switch $T_3$ and the fourth inverting switch $T_4$ have opposite switch conditions and switch on by turns. The first rectifying switch $D_1$ and the second rectifying switch $D_2$ have opposite switch conditions and switch on by turns. The third rectifying switch $D_3$ and the fourth rectifying switch $D_4$ have opposite switch conditions and switch on by turns.

In this embodiment, by switching the states of the support capacitor $C_1$ and the resonance tanks $RT_1$, $RT_2$, the voltage ratio of the switched-tank DC transformer 1 is allowed to vary between 1 and 4. Some specific examples are shown as follows. However, in the actual applications, the way of switching the states of the support capacitor $C_1$ and the resonance tanks $RT_1$, $RT_2$ is not limited thereto.

Figure 3A:
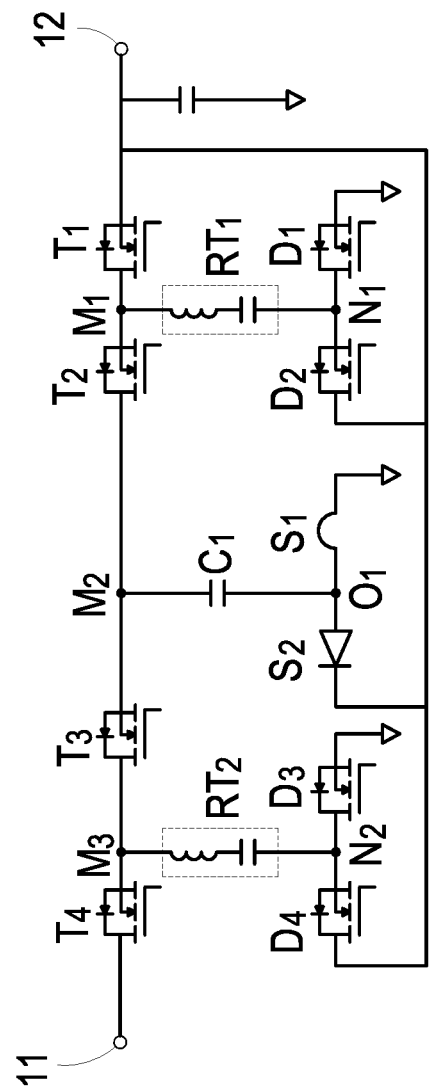
FIG. 3A is a schematic circuit diagram illustrating the switched-tank DC transformer of FIG. 2A, wherein the support capacitor is in a first voltage ratio switching state, and the resonance tanks are in a normal state.
Figure 3B:
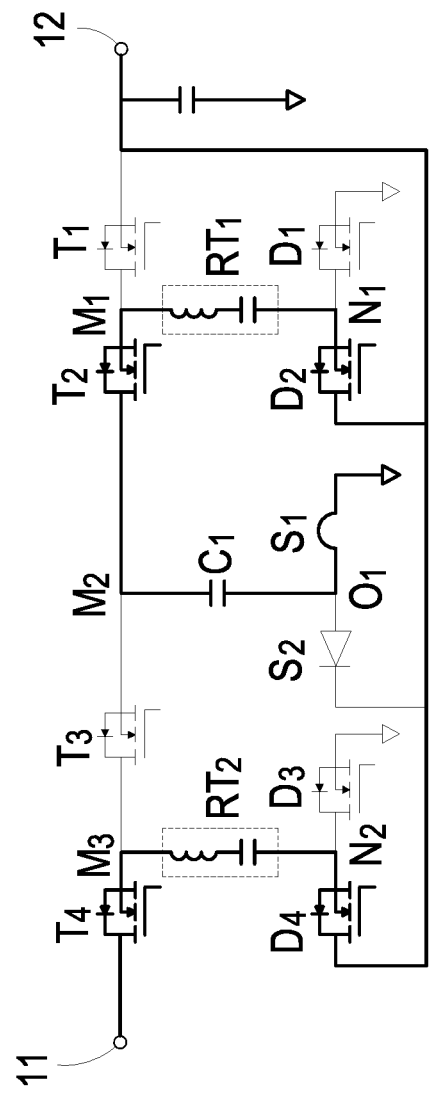
FIGS. 3B and 3C are schematic diagrams showing the different switch conditions of the switched-tank DC transformer of FIG. 3A.
Figure 3C:
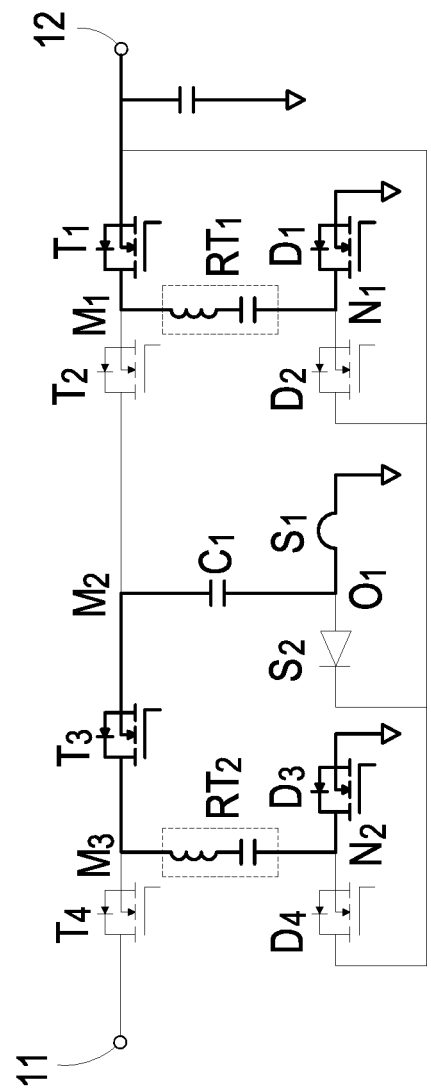

Under the circumstance that the first support capacitor $C_1$ is switched from the normal state to the first voltage ratio switching state, and the resonance tanks $RT_1$, $RT_2$ are in the normal state. As shown in FIG. 3A, the first clamping switch $S_1$ is kept constantly in the ON state, the second clamping switch $S_2$ is kept constantly in the OFF state, thus the first clamping node $O_1$ is kept constantly in electrical connection with the ground terminal. The two different switch conditions are shown in FIGS. 3B and 3C. The voltage ratio of the switched-tank DC transformer 1 equals 3. Under this circumstance, the voltage ratio is reduced by 1 as compared with the voltage ratio of the switched-tank DC transformer 1 of FIG. 2A.

Figure 4A:
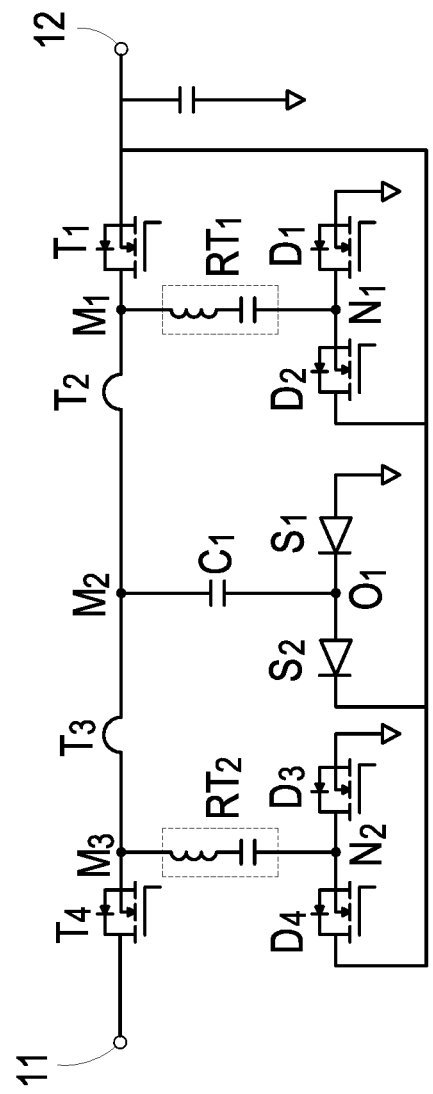
FIG. 4A is a schematic circuit diagram illustrating the switched-tank DC transformer of FIG. 2A, wherein the support capacitor is in a second voltage ratio switching state, and the resonance tanks are in the normal state.
Figure 4B:
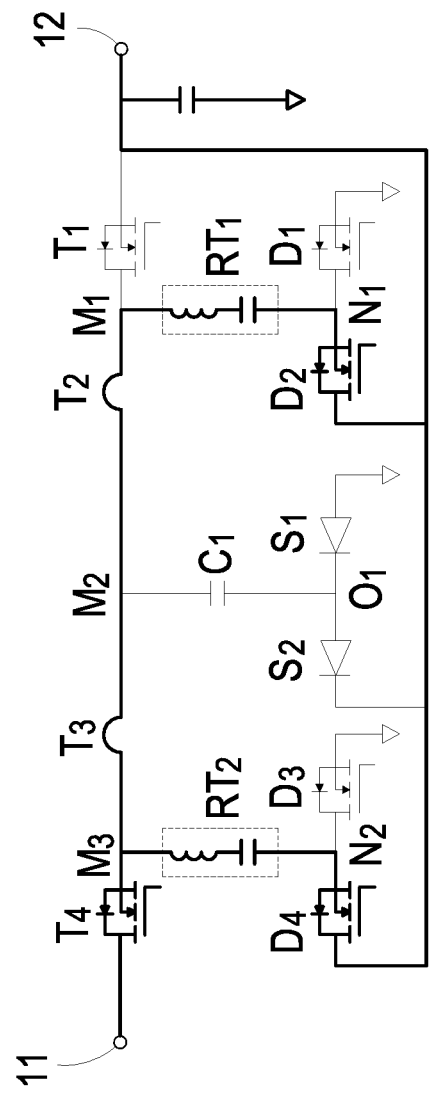
FIGS. 4B and 4C are schematic diagrams showing the different switch conditions of the switched-tank DC transformer of FIG. 4A.
Figure 4C:
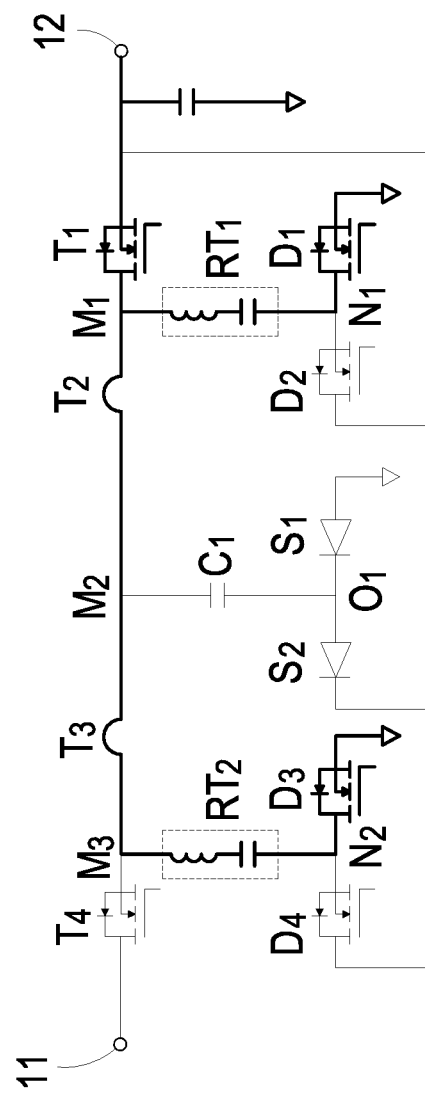

Under the circumstance that the first support capacitor $C_1$ is switched from the normal state to the second voltage ratio switching state, and the resonance tanks $RT_1$, $RT_2$ are in the normal state. As shown in FIG. 4A, the first clamping switch $S_1$ and the second clamping switch $S_2$ are kept constantly in the OFF state, thus the first clamping node $O_1$ is kept constantly in the open-circuit condition. The second inverting switch $T_2$ and the third inverting switch $T_3$ are kept constantly in the ON state. The two different switch conditions are shown in FIGS. 4B and 4C. The voltage ratio of the switched-tank DC transformer 1 equals 2. Under this circumstance, the voltage ratio is reduced by 2 as compared with the voltage ratio of the switched-tank DC transformer 1 of FIG. 2A. Alternatively, in an embodiment, the first resonance tank $RT_1$ or the second resonance tank $RT_2$ is switched from the normal state to the second voltage ratio switching state, so as to make the voltage ratio of the switched-tank DC transformer 1 equal to 2.

Figure 5A:
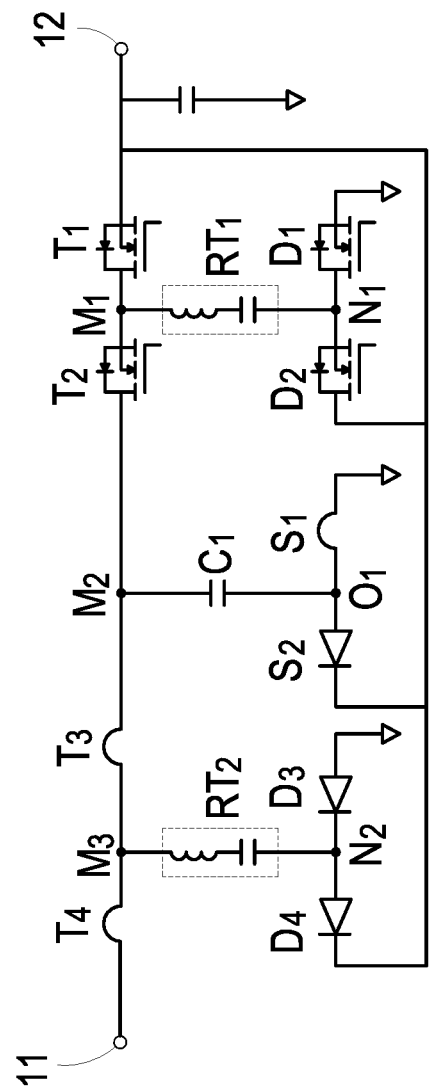
FIG. 5A is a schematic circuit diagram illustrating the switched-tank DC transformer of FIG. 2A, wherein the support capacitor is in the first voltage ratio switching state, the first resonance tank is in the normal state, and the second resonance tank is in the second voltage ratio switching state.
Figure 5B:
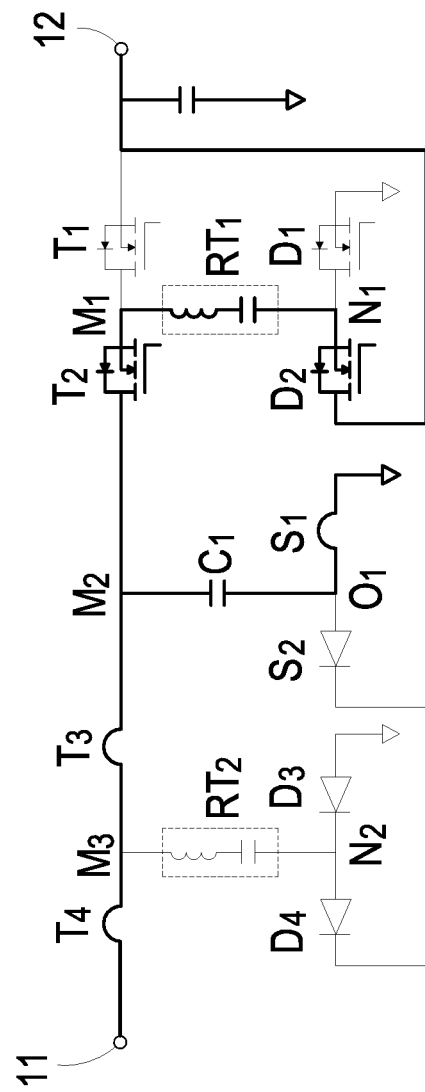
FIGS. 5B and 5C are schematic diagrams showing the different switch conditions of the switched-tank DC transformer of FIG. 5A.
Figure 5C:
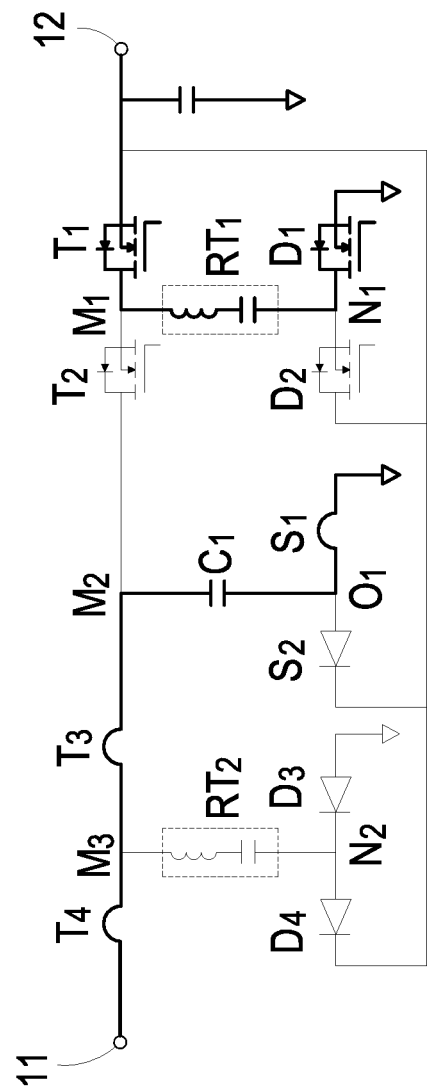

Under the circumstance that the first support capacitor $C_1$ is switched from the normal state to the first voltage ratio switching state, and the second resonance tank $RT_2$ is switched from the normal state to the second voltage ratio switching state. As shown in FIG. 5A, the first clamping switch $S_1$ is kept constantly in the ON state, the second clamping switch $S_2$ is kept constantly in the OFF state, thus the first clamping node $O_1$ is kept constantly in electrical connection with the ground terminal. The third rectifying switch $D_3$ and the fourth rectifying switch $D_4$ are kept constantly in the OFF state, thus the second rectifying node $N_2$ is kept constantly in the open-circuit condition. The third inverting switch $T_3$ and the fourth inverting switch $T_4$ are kept constantly in the ON state. The two different switch conditions are shown in FIGS. 5B and 5C. The voltage ratio of the switched-tank DC transformer 1 equals 1. Under this circumstance, the voltage ratio is reduced by 3 as compared with the voltage ratio of the switched-tank DC transformer 1 of FIG. 2A. Alternatively, in an embodiment, the first support capacitor $C_1$ is switched from the normal state to the first voltage ratio switching state, and the first resonance tank $RT_1$ is switched from the normal state to the second voltage ratio switching state, so as to make the voltage ratio of the switched-tank DC transformer 1 equal to 1.

Figure 6:
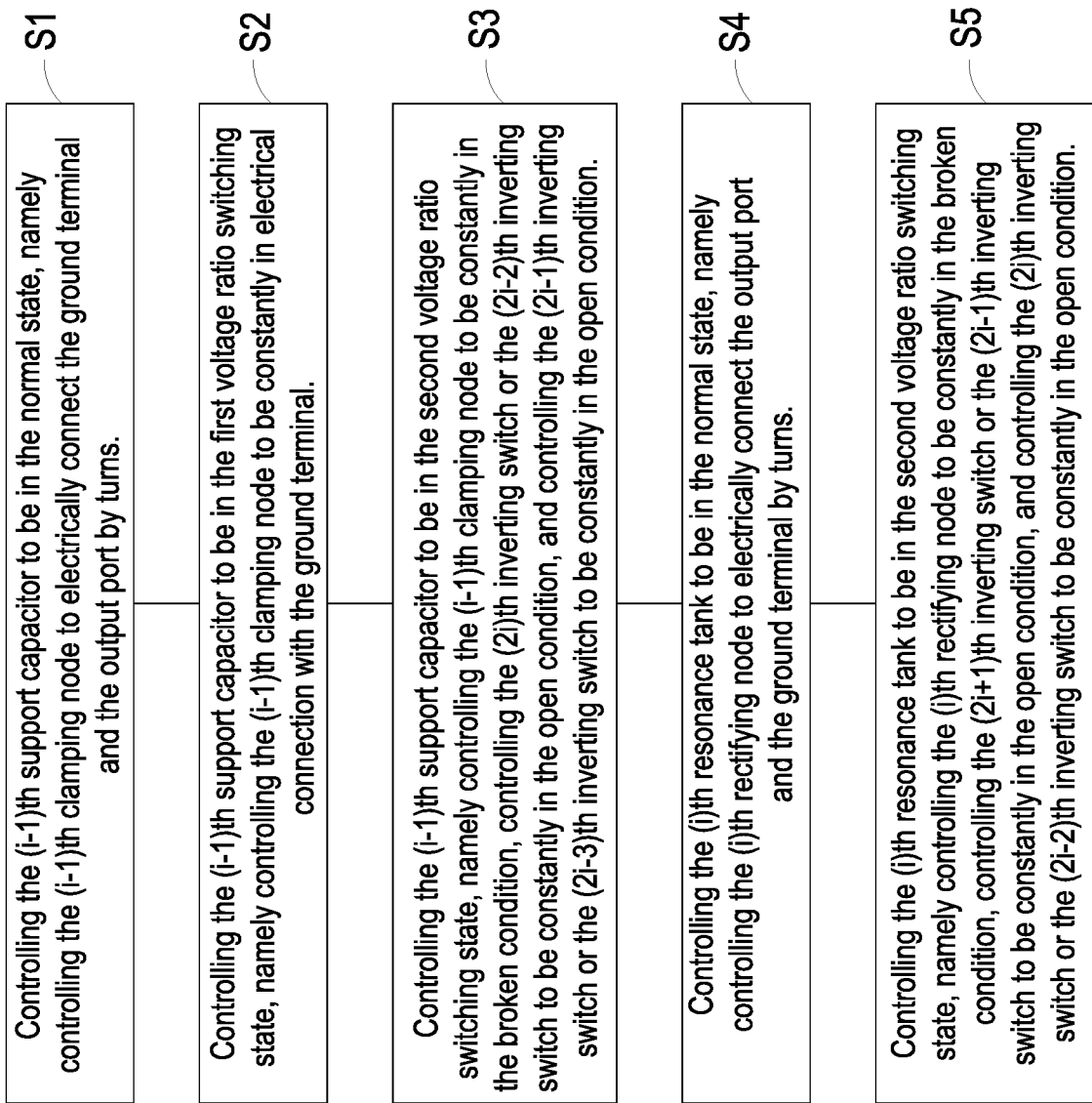
FIG. 6 is a flowchart illustrating a voltage ratio switching method according an embodiment of the present disclosure.

FIG. 6 is a flowchart illustrating a voltage ratio switching method according an embodiment of the present disclosure. The voltage ratio switching method is applied to the switched-tank DC transformer 1 of FIG. 1. The voltage ratio switching method controls the switch conditions of the support capacitors ($C_1$, $C_2$ to $C_{n-1}$) and the resonance tanks ($RT_1$, $RT_2$ to $RT_n$), and further adjusts the voltage ratio of the switched-tank DC transformer 1. The voltage ratio switching method includes the following steps S1, S2, S3, S4 and S5.

Step S1: Controlling the (i−1)th support capacitor $C_{i-1}$ to be in the normal state, namely controlling the (i−1)th clamping node $O_{i-1}$ to electrically connect the ground terminal and the output terminal 12 by turns.

Step S2: Controlling the (i−1)th support capacitor $C_{i-1}$ to be in the first voltage ratio switching state, namely controlling the (i−1)th clamping node $O_{i-1}$ to be constantly in electrical connection with the ground terminal. In an embodiment, the (2i−2)th clamping switch $S_{2i-2}$ is controlled to be constantly in the OFF state, and the (2i−3)th clamping switch $S_{2i-3}$ is controlled to be constantly in the ON state.

Step S3: Controlling the (i−1)th support capacitor $C_{i-1}$ to be in the second voltage ratio switching state, namely controlling the (i−1)th clamping node $O_{i-1}$ to be constantly in the open-circuit condition, controlling the (2i)th inverting switch $T_{2i}$ or the (2i−2)th inverting switch $T_{2i-2}$ to be constantly in the ON state, and controlling the (2i−1)th inverting switch $T_{2i-1}$ or the (2i−3)th inverting switch $T_{2i-3}$ to be constantly in the ON state. In an embodiment, the (2i−2)th clamping switch $S_{2i-2}$ and the (2i−3)th clamping switch $S_{2i-3}$ are controlled to be constantly in the OFF state, thus the (i−1)th clamping node $O_{i-1}$ is kept constantly in the open-circuit condition.

Step S4: Controlling the (i)th resonance tank $RT_i$ to be in the normal state, namely controlling the (i)th rectifying node $N_i$ to electrically connect the output terminal 12 and the ground terminal by turns.

Step S5: Controlling the (i)th resonance tank $RT_i$ to be in the second voltage ratio switching state, namely controlling the (i)th rectifying node $N_i$ to be constantly in the open-circuit condition, controlling the (2i+1)th inverting switch $T_{2i+1}$ or the (2i−1)th inverting switch $T_{2i-1}$ to be constantly in the ON state, and controlling the (2i)th inverting switch $T_{2i}$ or the (2i−2)th inverting switch $T_{2i-2}$ to be constantly in the ON state. In an embodiment, the (2i)th rectifying switch $D_{2i}$ and the (2i−1)th rectifying switch $D_{2i-1}$ are controlled to be constantly in the OFF state, thus the (i)th rectifying node $N_i$ is kept constantly in the open-circuit condition.

In an embodiment, the step S4 further includes a step of controlling the first resonance tank $RT_1$ to be in the normal state, namely the first rectifying node $N_i$ is controlled to electrically connect the output terminal 12 and the ground terminal by turns. In an embodiment, the step S5 further includes a step of controlling the first resonance tank $RT_1$ to be in the second voltage ratio switching state. Namely, the first rectifying node $N_1$ is controlled to be constantly in the open-circuit condition (for example, controlling the second rectifying switch $D_2$ and the first rectifying switch $D_1$ to be constantly in the OFF state). The third inverting switch $T_3$ or the first inverting switch $T_1$ is controlled to be constantly in the ON state. The second inverting switch $T_2$ is controlled to be constantly in the ON state.

It is noted that FIG. 6 only shows the steps included by the voltage ratio switching method. There is no order relationship among the steps S1, S2, S3, S4 and S5. One or plural of the steps can be performed in any order according to the actual requirements, and meanwhile the number of steps performed is not limited. Moreover, the above steps can be performed to one or plural support capacitor(s) ($C_1$, $C_2$ to $C_{n-1}$) and/or one or plural resonance tank(s) ($RT_1$, $RT_2$ to $RT_n$). In addition, while the step(s) is/are performed, the effect on the voltage ratio of the switched-tank DC transformer 1 is described as follows.

After the step S1 is performed to any support capacitor ($C_1$, $C_2$ to $C_{n-1}$), if the step S2 is performed to that support capacitor ($C_1$, $C_2$ to $C_{n-1}$), the voltage ratio of the switched-tank DC transformer 1 is subtracted by 1. On the contrary, after the step S2 is performed to any support capacitor ($C_1$, $C_2$ to $C_{n-1}$), if the step S1 is performed to that support capacitor ($C_1$, $C_2$ to $C_{n-1}$), the voltage ratio of the switched-tank DC transformer 1 is increased by 1. Since the n−1 support capacitors $C_1$, $C_2$ to $C_{n-1}$ can be switched between the normal state and the first voltage ratio switching state by the voltage ratio switching method, the voltage ratio of the switched-tank DC transformer 1 is allowed to vary between n+1 and 2n.

After the step S1 is performed to any support capacitor ($C_1$, $C_2$ to $C_{n-1}$), if the step S3 is performed to that support capacitor ($C_1$, $C_2$ to $C_{n-1}$), the voltage ratio of the switched-tank DC transformer 1 is subtracted by 2. On the contrary, after the step S3 is performed to any support capacitor ($C_1$, $C_2$ to $C_{n-1}$), if the step S1 is performed to that support capacitor ($C_1$, $C_2$ to $C_{n-1}$), the voltage ratio of the switched-tank DC transformer 1 is increased by 2. Since the n−1 support capacitors $C_1$, $C_2$ to $C_{n-1}$ can be switched between the normal state and the second voltage ratio switching state by the voltage ratio switching method, the voltage ratio of the switched-tank DC transformer 1 is allowed to vary between 2 and 2n.

After the step S4 is performed to any resonance tank ($RT_1$, $RT_2$ to $RT_n$), if the step S5 is performed to that resonance tank ($RT_1$, $RT_2$ to $RT_n$), the voltage ratio of the switched-tank DC transformer 1 is subtracted by 2. On the contrary, after the step S5 is performed to any resonance tank ($RT_1$, $RT_2$ to $RT_n$), if the step S4 is performed to that resonance tank ($RT_1$, $RT_2$ to $RT_n$), the voltage ratio of the switched-tank DC transformer 1 is increased by 2. Since the n resonance tanks $RT_1$, $RT_2$ to $RT_n$ can be switched between the normal state and the second voltage ratio switching state by the voltage ratio switching method, the voltage ratio of the switched-tank DC transformer 1 is allowed to vary between 2 and 2n.

After the steps S1 and S4 are performed to A support capacitor(s) ($C_1$, $C_2$ to $C_{n-1}$) and B resonance tank(s) ($RT_1$, $RT_2$ to $RT_n$) respectively, if the steps S3 and S5 are performed to the A support capacitor(s) ($C_1$, $C_2$ to $C_{n-1}$) and the B resonance tank(s) ($RT_1$, $RT_2$ to $RT_n$) respectively, the voltage ratio of the switched-tank DC transformer 1 is subtracted by 2A+2B. On the contrary, after the steps S3 and S5 are performed to A support capacitor(s) ($C_1$, $C_2$ to $C_{n-1}$) and B resonance tank(s) ($RT_1$, $RT_2$ to $RT_n$) respectively, if the steps S1 and S4 are performed to the A support capacitor(s) ($C_1$, $C_2$ to $C_{n-1}$) and the B resonance tank(s) ($RT_1$, $RT_2$ to $RT_n$) respectively, the voltage ratio of the switched-tank DC transformer 1 is increased by 2A+2B. A is a natural number smaller than or equal to n−1, and B is a natural number smaller than or equal to n. Since the n−1 support capacitors $C_1$, $C_2$ to $C_{n-1}$ and the n resonance tanks $RT_1$, $RT_2$ to $RT_n$ can be switched between the normal state and the second voltage ratio switching state by the voltage ratio switching method, the voltage ratio of the switched-tank DC transformer 1 is allowed to vary between 2 and 2n.

After the steps S1 and S4 are performed to A support capacitor(s) ($C_1$, $C_2$ to $C_{n-1}$) and B resonance tank(s) ($RT_1$, $RT_2$ to $RT_n$) respectively, if the steps S2 and S5 are performed to the A support capacitor(s) ($C_1$, $C_2$ to $C_{n-1}$) and the B resonance tank(s) ($RT_1$, $RT_2$ to $RT_n$) respectively, the voltage ratio of the switched-tank DC transformer 1 is subtracted by A+2B. On the contrary, after the steps S2 and S5 are performed to A support capacitor(s) ($C_1$, $C_2$ to $C_{n-1}$) and B resonance tank(s) ($RT_1$, $RT_2$ to $RT_n$) respectively, if the steps S1 and S4 are performed to the A support capacitor(s) ($C_1$, $C_2$ to $C_{n-1}$) and the B resonance tank(s) ($RT_1$, $RT_2$ to $RT_n$) respectively, the voltage ratio of the switched-tank DC transformer 1 is increased by A+2B. Since the n−1 support capacitors $C_1$, $C_2$ to $C_{n-1}$ and the n resonance tanks $RT_1$, $RT_2$ to $RT_n$ can be switched between the normal state and the first voltage ratio switching state by the voltage ratio switching method, the voltage ratio of the switched-tank DC transformer 1 is allowed to vary between 1 and 2n.

From the above descriptions, the present disclosure provides a switched-tank DC transformer and a voltage ratio switching method thereof. In the switched-tank DC transformer, every support capacitor and every resonance tank is switchable to be in a normal state or a voltage ratio switching state. Accordingly, the voltage ratio of the switched-tank DC transformer is changed at will. When the input voltage varies in a wide range, the range of the output voltage can be limited by adjusting the voltage ratio of the switched-tank DC transformer. Therefore, both the high efficiency of power transformation and the adjustable output voltage are achieved. Moreover, with regard to the voltage regulator module including the switched-tank DC transformer, the efficiency and quality of supplying power thereof are enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switched-tank DC transformer, comprising:
    an input terminal and an output terminal;
    2n inverting switches serially connected to form n inverting half-bridge circuits, wherein n is an integer larger than or equal to 2, the first inverting switch is electrically connected with the output terminal, the (2n)th inverting switch is electrically connected with the input terminal, there is an inverting node between every two neighboring inverting switches, the (2i−1)th inverting node is between the (2i)th inverting switch and the (2i−1)th inverting switch, and i is an integer larger than or equal to 2 and smaller than or equal to n;
    2n rectifying switches forming n rectifying half-bridge circuits sequentially, wherein each of the n rectifying half-bridge circuits comprises two rectifying switches serially connected with each other, one terminal of both the two rectifying switches are electrically connected with a rectifying node, the other terminal of the two rectifying switches are electrically connected with a ground terminal and the output terminal respectively, and the (i)th rectifying node is between the (2i)th rectifying switch and the (2i−1)th rectifying switch;
    2n−2 clamping switches forming n−1 clamping half-bridge circuits sequentially, wherein each of the n−1 clamping half-bridge circuits comprises two clamping switches serially connected with each other, one terminal of both the two clamping switches are electrically connected with a clamping node, the other terminal of the two clamping switches are electrically connected with the ground terminal and the output terminal respectively, and the (i−1)th clamping node is between the (2i−2)th clamping switch and the (2i−3)th clamping switch;

n resonance tanks, wherein the resonance tank is electrically connected between the corresponding inverting node and the corresponding rectifying node, and the (i)th resonance tank is electrically connected between the (2i−1)th inverting node and the (i)th rectifying node; and n−1 support capacitors, wherein the support capacitor is electrically connected between the corresponding inverting node and the corresponding clamping node, and the (i−1)th support capacitor is electrically connected between the (2i−2)th inverting node and the (i−1)th clamping node, wherein each of the n−1 support capacitors is switchable to be in a normal state or a voltage ratio switching state, each of the n resonance tanks is switchable to be in the normal state or the voltage ratio switching state, thus a voltage ratio of the switched-tank DC transformer varies between 2 and 2n, when the (i−1)th support capacitor is in the normal state, the (i−1)th clamping node is electrically connected with the ground terminal and the output terminal by turns; when the (i−1)th support capacitor is in the voltage ratio switching state, the (i−1)th clamping node is kept constantly in an open-circuit condition, the (2i)th inverting switch or the (2i−2)th inverting switch is kept constantly in an ON state, the (2i−1)th inverting switch or the (2i−3)th inverting switch is kept constantly in the ON state, when the (i)th resonance tank is in the normal state, the (i)th rectifying node is electrically connected with the output terminal and the ground terminal by turns; when the (i)th resonance tank is in the voltage ratio switching state, the (i)th rectifying node is kept constantly in the open-circuit condition, the (2i+1)th inverting switch or the (2i−1)th inverting switch is kept constantly in the ON state, the (2i)th inverting switch or the (2i−2)th inverting switch is kept constantly in the ON state.

2. The switched-tank DC transformer according to claim 1, wherein when the first resonance tank is in the normal state, the first rectifying node is electrically connected with the output terminal and the ground terminal by turns; wherein when the first resonance tank is in the voltage ratio switching state, the first rectifying node is kept constantly in the open-circuit condition, the third inverting switch or the first inverting switch is kept constantly in the ON state, and the second inverting switch is kept constantly in the ON state.

3. The switched-tank DC transformer according to claim 1, wherein when the (i−1)th support capacitor and the (i)th resonance tank are both in the normal state, the (2i−2)th clamping switch, the (2i−1)th inverting switch and the (2i−1)th rectifying switch are simultaneously in the ON state or an OFF state, and the (2i−3)th clamping switch, the (2i)th inverting switch and the (2i)th rectifying switch are simultaneously in the OFF state or the ON state correspondingly.

4. The switched-tank DC transformer according to claim 3, wherein when the (i−1)th support capacitor and the (i)th resonance tank are both in the normal state, the (2i−2)th clamping switch and the (2i−3)th clamping switch have opposite switch conditions and switch on by turns; the (2i−1)th inverting switch and the (2i)th inverting switch have opposite switch conditions and switch on by turns; and the (2i−1)th rectifying switch and the (2i)th rectifying switch have opposite switch conditions and switch on by turns.

5. The switched-tank DC transformer according to claim 1, wherein when the (i−1)th support capacitor is in the voltage ratio switching state, the (2i−2)th clamping switch and the (2i−3)th clamping switch are kept constantly in an OFF state, the (2i)th inverting switch or the (2i−2)th inverting switch is kept constantly in the ON state, and the (2i−1)th inverting switch or the (2i−3)th inverting switch is kept constantly in the ON state.

6. The switched-tank DC transformer according to claim 1, wherein when the (i)th resonance tank is in the voltage ratio switching state, the (2i)th rectifying switch and the (2i−1)th rectifying switch are kept constantly in an OFF state, the (2i+1)th inverting switch or the (2i−1)th inverting switch is kept constantly in the ON state, and the (2i)th inverting switch or the (2i−2)th inverting switch is kept constantly in the ON state.

7. The switched-tank DC transformer according to claim 1, wherein when the first resonance tank is in the voltage ratio switching state, the second rectifying switch and the first rectifying switch are kept constantly in an OFF state, the third inverting switch or the first inverting switch is kept constantly in the ON state, and the second inverting switch is kept constantly in the ON state.

8. The switched-tank DC transformer according to claim 1, wherein when any of the support capacitors or any of the resonance tanks is switched from the normal state to the voltage ratio switching state, the voltage ratio of the switched-tank DC transformer is subtracted by 2, and when any of the support capacitors or any of the resonance tanks is switched from the voltage ratio switching state to the normal state, the voltage ratio of the switched-tank DC transformer is increased by 2.

9. The switched-tank DC transformer according to claim 1, wherein when A support capacitor(s) and B resonance tank(s) are switched from the normal state to the voltage ratio switching state, the voltage ratio of the switched-tank DC transformer is subtracted by 2A+2B, when A support capacitor(s) and B resonance tank(s) are switched from the voltage ratio switching state to the normal state, the voltage ratio of the switched-tank DC transformer is increased by 2A+2B, and A is a natural number smaller than or equal to n−1, B is a natural number smaller than or equal to n.

10. The switched-tank DC transformer according to claim 1, wherein each of the resonance tanks comprises an inductor or a capacitor or each of the resonance tanks comprises an inductor and a capacitor serially connected with each other.

11. A voltage ratio switching method of a switched-tank DC transformer, wherein the switched-tank DC transformer comprises an input terminal, an output terminal, 2n inverting switches, 2n rectifying switches, 2n−2 clamping switches, n resonance tanks and n−1 support capacitors, n is an integer larger than or equal to 2, the 2n inverting switches are serially connected to form n inverting half-bridge circuits, the first inverting switch is electrically connected with the output terminal, the (2n)th inverting switch is electrically connected with the input terminal, there is an inverting node between every two neighboring inverting switches, the (2i−1)th inverting node is between the (2i)th inverting switch and the (2i−1)th inverting switch, and i is an integer larger than or equal to 2 and smaller than or equal to n; the 2n rectifying switches form n rectifying half-bridge circuits sequentially, each of the n rectifying half-bridge circuits comprises two rectifying switches serially connected with each other, one terminal of both the two rectifying switches are electrically connected with a rectifying node, the other terminal of the two rectifying switches are electrically connected with a ground terminal and the output terminal respectively, and the (i)th rectifying node is between the (2i)th rectifying switch and the (2i−1)th rectifying switch; the 2n−2 clamping switches form n−1 clamping half-bridge circuits sequentially, each of the n−1 clamping half-bridge circuits comprises two clamping switches serially connected with each other, one terminal of both the two clamping switches are electrically connected with a clamping node, the other terminal of the two clamping switches are electrically connected with the ground terminal and the output terminal respectively, and the (i−1)th clamping node is between the (2i−2)th clamping switch and the (2i−3)th clamping switch; the resonance tank is electrically connected between the corresponding inverting node and the corresponding rectifying node, and the (i)th resonance tank is electrically connected between the (2i−1)th inverting node and the (i)th rectifying node; and the support capacitor is electrically connected between the corresponding inverting node and the corresponding clamping node, and the (i−1)th support capacitor is electrically connected between the (2i−2)th inverting node and the (i−1)th clamping node, the voltage ratio switching method controlling every support capacitor to be switchably in a normal state or a voltage ratio switching state, the voltage ratio switching method controlling every resonance tank to be switchably in the normal state or the voltage ratio switching state, the voltage ratio switching method allowing a voltage ratio of the switched-tank DC transformer to vary between 2 and 2n, the voltage ratio switching method comprising:

(a) controlling the (i−1)th support capacitor to be in the normal state, namely controlling the (i−1)th clamping node to electrically connect the ground terminal and the output terminal by turns;

(b) controlling the (i−1)th support capacitor to be in the voltage ratio switching state, namely controlling the (i−1)th clamping node to be constantly in an open-circuit condition, controlling the (2i)th inverting switch or the (2i−2)th inverting switch to be constantly in an ON state, and controlling the (2i−1)th inverting switch or the (2i−3)th inverting switch to be constantly in the ON state;

(c) controlling the (i)th resonance tank to be in the normal state, namely controlling the (i)th rectifying node to electrically connect the output terminal and the ground terminal by turns; and (d) controlling the (i)th resonance tank to be in the voltage ratio switching state, namely controlling the (i)th rectifying node to be constantly in the open-circuit condition, controlling the (2i+1)th inverting switch or the (2i−1)th inverting switch to be constantly in the ON state, and controlling the (2i)th inverting switch or the (2i−2)th inverting switch to be constantly in the ON state.

12. The voltage ratio switching method according to claim 11, wherein the step (c) further comprises a step of controlling the first resonance tank to be in the normal state, namely the first rectifying node is controlled to electrically connect the output terminal and the ground terminal by turns; and wherein the step (d) further comprises a step of controlling the first resonance tank to be in the voltage ratio switching state, namely, the first rectifying node is controlled to be constantly in the open-circuit condition, the third inverting switch or the first inverting switch is controlled to be constantly in the ON state, and the second inverting switch is controlled to be constantly in the ON state.

13. The voltage ratio switching method according to claim 11, wherein when the (i−1)th support capacitor and the (i)th resonance tank are both in the normal state, the (2i−2)th clamping switch, the (2i−1)th inverting switch and the (2i−1)th rectifying switch are simultaneously in the ON state or an OFF state, and the (2i−3)th clamping switch, the (2i)th inverting switch and the (2i)th rectifying switch are simultaneously in the OFF state or the ON state correspondingly.

14. The voltage ratio switching method according to claim 11, wherein when the (i−1)th support capacitor and the (i)th resonance tank are both in the normal state, the (2i−2)th clamping switch and the (2i−3)th clamping switch have opposite switch conditions and switch on by turns; the (2i−1)th inverting switch and the (2i)th inverting switch have opposite switch conditions and switch on by turns; and the (2i−1)th rectifying switch and the (2i)th rectifying switch have opposite switch conditions and switch on by turns.

15. The voltage ratio switching method according to claim 11, wherein in the step (b), the (2i−2)th clamping switch and the (2i−3)th clamping switch are controlled to be constantly in an OFF state, the (2i)th inverting switch or the (2i−2)th inverting switch is controlled to be constantly in the ON state, and the (2i−1)th inverting switch or the (2i−3)th inverting switch is controlled to be constantly in the ON state.

16. The voltage ratio switching method according to claim 11, wherein in the step (d), the (2i)th rectifying switch and the (2i−1)th rectifying switch are controlled to be constantly in an OFF state, the (2i+1)th inverting switch or the (2i−1)th inverting switch is controlled to be constantly in the ON state, and the (2i)th inverting switch or the (2i−2)th inverting switch is controlled to be constantly in the ON state.

17. The voltage ratio switching method according to claim 11, wherein the step (d) further comprises: controlling the second rectifying switch and the first rectifying switch to be constantly in an OFF state, controlling the third inverting switch or the first inverting switch to be constantly in the ON state, and controlling the second inverting switch to be constantly in the ON state.

18. The voltage ratio switching method according to claim 11, wherein after performing the step (a) to any of the support capacitors, if the step (b) is performed to that support capacitor, the voltage ratio of the switched-tank DC transformer is subtracted by 2, and wherein after performing the step (b) to any of the support capacitors, if the step (a) is performed to that support capacitor, the voltage ratio of the switched-tank DC transformer is increased by 2.

19. The voltage ratio switching method according to claim 11, wherein after performing the step (c) to any of the resonance tanks, if the step (d) is performed to that resonance tank, the voltage ratio of the switched-tank DC transformer is subtracted by 2, and wherein after performing the step (d) to any of the resonance tanks, if the step (c) is performed to that resonance tank, the voltage ratio of the switched-tank DC transformer is increased by 2.

20. The voltage ratio switching method according to claim 11, wherein after performing the steps (a) and (c) to A support capacitor(s) and B resonance tank(s) respectively, if the steps (b) and (d) are performed to the A support capacitor(s) and the B resonance tank(s) respectively, the voltage ratio of the switched-tank DC transformer is subtracted by 2A+2B, wherein after performing the steps (b)

and (d) to A support capacitor(s) and B resonance tank(s) respectively, if the steps (a) and (c) are performed to the A support capacitor(s) and the B resonance tank(s) respectively, the voltage ratio of the switched-tank DC transformer is increased by 2A+2B, and A is a natural number smaller than or equal to n−1, B is a natural number smaller than or equal to n.

* * * * *